United States Patent [19]

Shaw et al.

[11] Patent Number: 5,219,048
[45] Date of Patent: Jun. 15, 1993

[54] ELECTRIC DISC BRAKE

[75] Inventors: Schuyler S. Shaw, Dayton; Donald E. Schenk, Vandalia, both of Ohio

[73] Assignee: General Motors Corporation, Detroit, Mich.

[21] Appl. No.: 876,988

[22] Filed: May 1, 1992

[51] Int. Cl.⁵ .................... F16D 65/34; F16D 55/14
[52] U.S. Cl. .................... 188/72.1; 188/72.2; 188/72.8; 188/73.42; 188/73.45; 188/156; 188/158; 188/106 P; 188/162; 188/346
[58] Field of Search .............. 188/72.1, 72.2, 73.41, 188/73.42, 73.43, 72.5, 71.1, 71.8, 71.2, 346, 181 T, 156, 158, 161, 162, 163, 72.8, 73.45, 106 P

[56] References Cited

U.S. PATENT DOCUMENTS

| | | | |
|---|---|---|---|
| 3,478,845 | 11/1969 | Kita | 188/73.41 |
| 3,869,024 | 3/1975 | Hauth et al. | 188/72.5 |
| 3,923,345 | 12/1975 | Poggie | 188/106 P X |
| 3,993,173 | 11/1976 | Hoffman | 188/72.2 X |
| 4,591,028 | 5/1986 | Hagiwara et al. | 188/72.2 |
| 4,658,939 | 4/1987 | Kircher et al. | 188/72.8 X |
| 4,703,839 | 11/1987 | Nakano et al. | 188/346 |
| 4,756,391 | 7/1988 | Agarwal et al. | 188/106 P |
| 4,784,244 | 11/1988 | Carre et al. | 188/156 |
| 4,793,447 | 12/1988 | Taig et al. | 188/72.8 X |
| 4,800,993 | 1/1989 | Weber | 188/106 P X |
| 4,809,824 | 3/1989 | Fargier et al. | 188/106 P X |
| 4,836,338 | 6/1989 | Taig | 188/161 X |
| 4,852,699 | 8/1989 | Karnopp et al. | 188/72.2 |
| 4,944,372 | 7/1990 | Taig | 188/72.1 X |
| 5,024,298 | 6/1991 | Schenk et al. | 188/72.2 |
| 5,107,967 | 4/1992 | Fujita et al. | 188/156 X |

Primary Examiner—Douglas C. Butler
Attorney, Agent, or Firm—Ernest E. Helms

[57] ABSTRACT

A vehicle disc brake is provided which, in a preferred embodiment, includes a first caliper pivotally mounted with respect to the vehicle, a first brake shoe slidably mounted with respect to the first caliper for selective contact with a vehicle wheel rotor, an electric actuator to selectively move the first shoe into engagement with the rotor, an actuator plate mounted for relative motion with respect to the vehicle and operatively associated with the first caliper wherein movement of the first caliper resultant of the first shoe engagement with the rotor causes the actuator plate to move, a second caliper generally locationally fixed with respect to the vehicle wheel axis, a second brake shoe mounted by the second caliper operatively associated with the actuator plate for engagement with the rotor, and a ball captured in a ramp between the actuator plate and second brake shoe for converting movement of the actuator plate into movement of the second brake shoe to engage with the rotor.

14 Claims, 3 Drawing Sheets

ELECTRIC DISC BRAKE

FIELD OF THE INVENTION

The field of the present invention is that of disc brakes for automotive vehicles. More particularly, the field of the present invention is that of disc brakes which can be electrically actuated and a method of utilization thereof.

DISCLOSURE STATEMENT

It has been found desirable in the art of automotive braking to provide brakes which are electrically actuated rather than fluidly actuated brakes, which are currently commonly utilized. Electric brakes provide an advantage in that they are more suitable in use in antilock braking systems or traction control systems from a control standpoint. Additionally, the "brake by wire" concept bestows upon the automotive designer freedom previously unknown in the arrangement of the braking system components within a vehicle, especially those underneath a vehicle front hood.

However, there are many constraints in the utilization of electric brakes, especially disc brakes in vehicle. One constraint is that it is very difficult to provide an electrically actuated disc brake which provides the torsional frictional engagement necessary to give it operational characteristics which would not be shamed in comparison to those provided by fluid actuated disc brakes. Additionally, many electrically actuated disc brakes have very high amperage requirements. The amperage requirements cannot be easily designed around since the maximum voltage potential of the automotive vehicle system is usually already set at a value which is less than ideal for the high peak loads required by an electrically actuated brake.

DISCLOSURE OF THE INVENTION

The present invention brings forth that which those familiar with the art have waited and yearned for, freedom of an electrically actuated vehicle disc brake which is not shamed by an excessive amperage requirement or a torsional output which is inferior to that previously provided by fluid actuated brakes.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
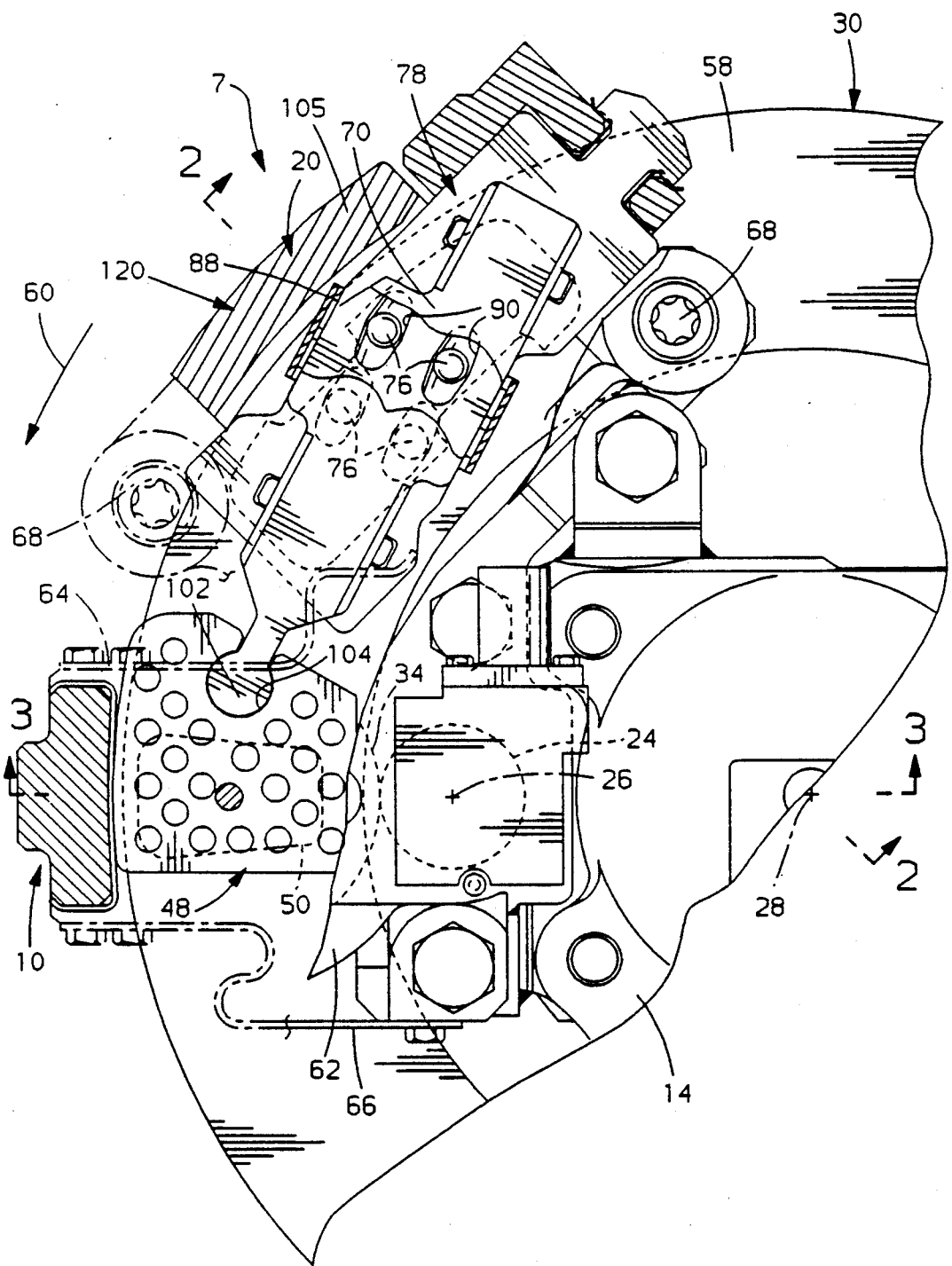
FIG. 1 is a front elevational view with portions cut away and with portions sectioned of a preferred embodiment brake according to the present invention.
Figure 2:
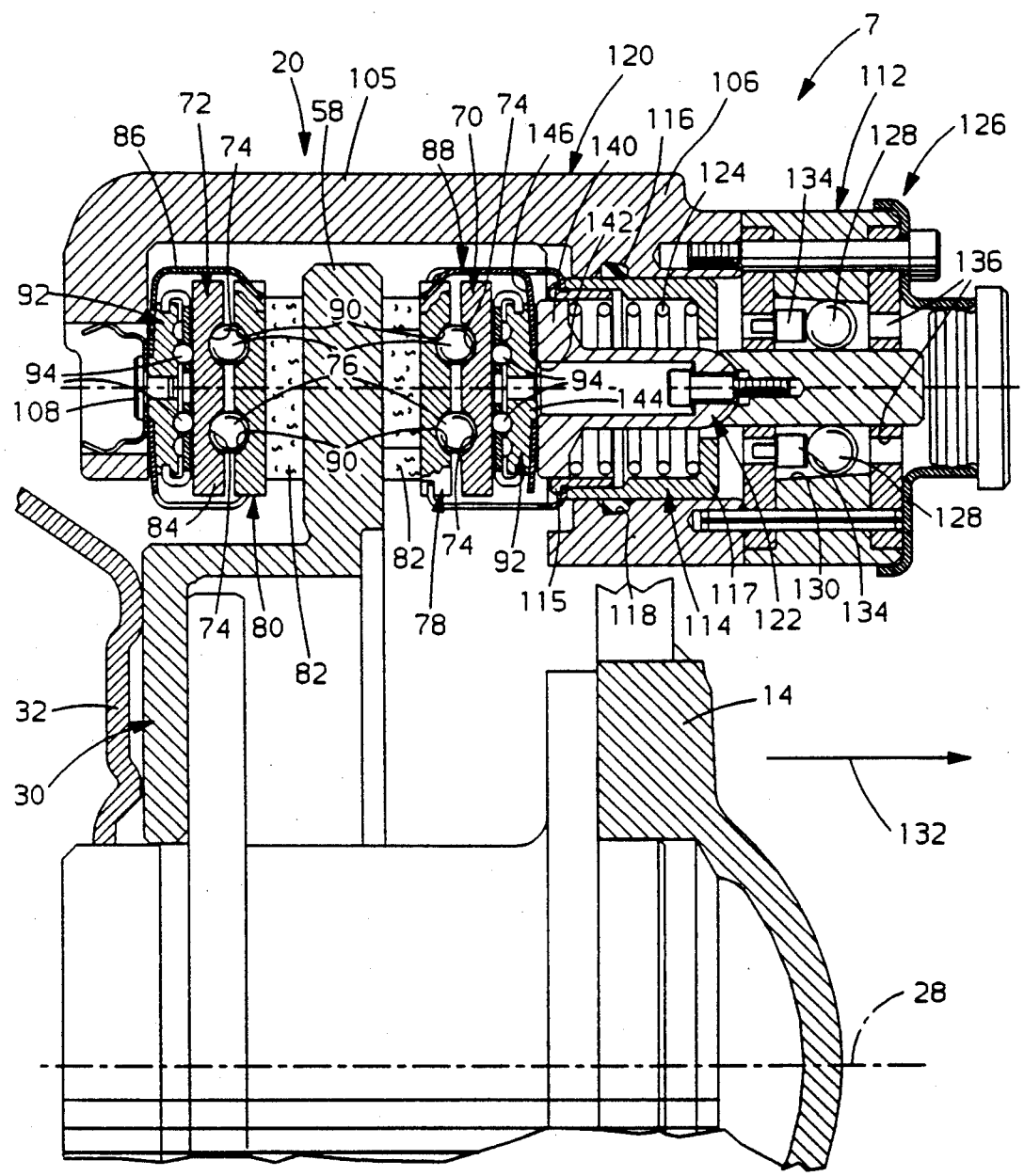
FIGS. 2 and 3 are taken along lines 2—2 and 3—3 of FIG. 1, respectively.
Figure 3:
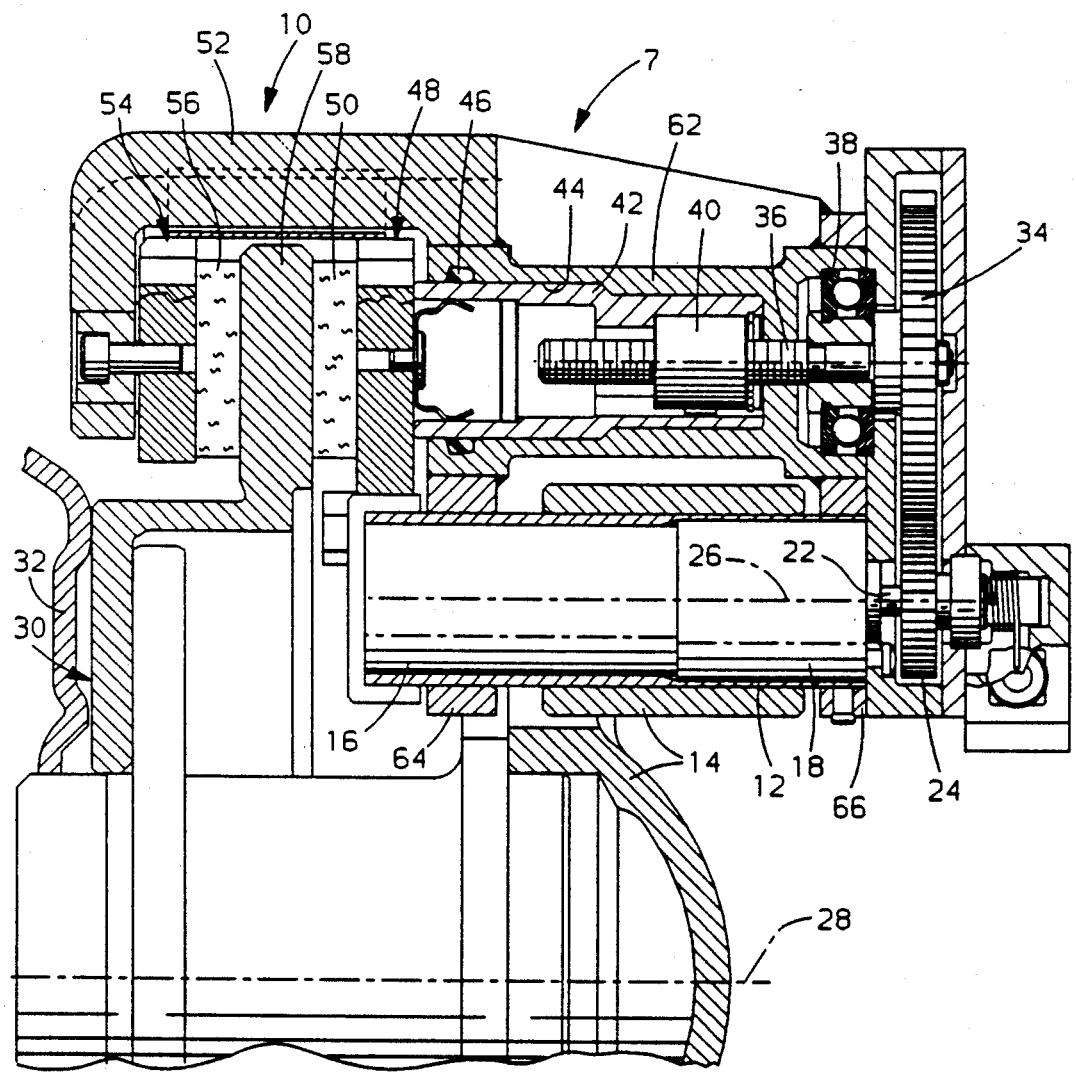

Referring to FIGS. 1, 2 and 3, the disc brake 7 has two calipers. The first caliper 10 is an actuator caliper and the second caliper 20 is actuated by motion imparted thereto by the first caliper 10.

The first caliper 10 is pivotally mounted with respect to the vehicle by virtue of a sleeve 12 which is inserted into a vehicle knuckle 14, generally fixed with respect to the vehicle. Within the sleeve 12 is an electric motor 16 which is torsionally associated with a reducing gearbox 18. The gearbox is torsionally associated with a shaft 22 having a first gear 24 connected thereto. The first gear 24 has an axis of rotation 26 which is coterminous with the pivotal axis of the first caliper 10 and noncoterminous with a rotation axis 28 of a brake rotor 30. The rotor 30 is connected with the wheel 32.

The first gear 24 is in torsional association with a second gear 34, which is in turn connected with a driven member 36. The driven member 36 (typically a ball screw) is mounted a thrust bearing 38 and has threadably associated therewith a ball nut 40. The ball nut 40 is fixed to a piston 42 in a nonrotative manner. The piston 42 is mounted within a bore 44 of the first caliper 10 and has a seal 46 which seals the bore 44 from debris entering the bore. The seal 46 also aids in preventing rotation of the piston 42.

The piston is connected with an actuator inboard shoe 48 having an associated lining 50. On the opposite side of a bridge 52 of the first caliper 10, there is an outboard shoe 54 with its associated lining 56. Juxtaposed between the lining 50,56 is a friction disc 58 of the rotor 30 which is connected with the vehicle wheel.

Actuation of the first caliper brake shoes 48,54 into engagement with the rotor friction disc 58 causes the caliper 10 to be angularly turned in the direction of rotation of the rotor 30. In a vehicle forward direction (as shown by arrow 60 in FIG. 1), it can be seen that stopping the vehicle will cause a counterclockwise movement of the first caliper 10, which, in and of itself, will cause relative rotation of the first 24 and second 34 gears, therefore causing a servo effect within the first caliper 10 rotating the driven member 36 to further thrust the piston 42 toward the rotor friction disc 58 (assuming the shaft 22 is held against rotation). An inner cylindrical frame 62 of the first caliper has fixably attached spring mounting members 64 and 66 which allow the caliper 10 to swing angularly as well as in a direction perpendicular to rotor friction surface 58 to bring brake lining 56 into contact with the friction surface 58.

The deformation of the polymeric seal 46 associated with movement of the piston 42 will cause the piston 42 to be retracted (upon deactivation) and to be positioned in such a location that the running clearance between the linings 50,56 and the rotor friction disc 58 is held at a minimum.

The first caliper 10 has connected thereto springs 64,66 (FIG. 1) which return the first caliper 10 to a neutral position whenever the brake shoes 48,54 are relieved from engagement with the rotor frictional disc 58.

The brake 7 of the present invention has a second caliper 20 which is angularly fixed with respect to the vehicle knuckle 14, via pins 68. The second caliper 20 is generally slidable along an axis which is generally parallel to the axis 28 of rotation of the rotor 30 via the pins 68.

Slidably mounted in a plane generally parallel to the plane of the rotor friction disc 58 with respect to the second caliper 20 is an actuator plate 70. The actuator plate is also pivotally associated with the first caliper 10 via a ball 102 and socket 104 type connection. Brake shoes 78 and 80 have associated actuator plates 70,72, respectively. Movement of the first caliper 10 imparts a linear movement within the actuator plate(s) 70,72. There is enough clearance between the ball and socket connection of the actuator plates 70,72 and the first caliper shoes 48,54 to allow for sufficient loss motion so that the movement of the actuator plate with respect to the first caliper is essentially linear.

The actuator plates 70,72 have ramp surfaces 74 which receive four balls 76, respectively. Second caliper brake shoes 78,80 are held to the second caliper 20 by abutment retaining clips 86,88 and have corresponding ramped surfaces 90 for receipt of the balls 76. Linear movement of the actuator plates 70,72 in either direction causes the actuator plates 70,72 to thrust the second caliper brake shoes 78,80 and their associated linings 82 into engagement with the brake rotor friction disc 58. A frame 120 of the second caliper 20 axially floats along an axis parallel with the axis 28 and upon activation will float to equalize the pressure placed on the rotor by the brake shoes 80 and 78.

The actuator plates 70,72 are mounted to the second caliper 20 by virtue of thrust ball 94 gibs 92 which prevent the movement of the actuator plates 70,72 away from the rotor of friction disc 58. The gibs 92 provide a "frictionless" (very low friction) surface for the actuator plates 70,72 to ride against as they are being loaded toward the gib. The gibs 92 are allowed pivotal movement with respect to the frame 120 of the second caliper by virtue of a pin 108 and a bracket flange 140 to provide for the slight angular movement of the actuator plates 70,72. It will be apparent to those skilled in the art that since the actuator 70,72 plates move at an angle with respect to the brake shoes 78,80, the brake shoes will exhibit a slight radial component with respect to the rotational axis 28 of the rotor upon actuation.

The actuator plates 72,70 are connected with their associated brake shoes 78,80 by secondary clips. The actuator plates 72,70 can float toward or away from the friction disc 58 as required. The purpose of the secondary clips which connect the actuator plate 70,72 with the brake shoes is to retain the balls 76 in their respective grooves during assembly of 70,78 and 72,80 and also to put a spring force between the actuator plate 72,70 and the brake shoes 78,80 to return the actuator plates 72,70 and the brake shoes 78,80 to their normal nonactuated position.

During normal actuation of the secondary caliper 20, a caliper bridge 105, although free to move, essentially remains stationary. The actuator plates 72,88 will move, causing the slack between the actuator plates 72,88 and the brake shoes 78,80 taken up by the balls 76 in tension, moving the brake shoes 78,80 toward the rotor friction disc 58. Since the caliper bridge 105 and body 106 essentially remain stationary, the outboard clip 86 will be deflected to compensate for the movement of the outboard brake shoe 80. The inboard shoe 78 will pull the inboard clip 88 along with it, causing a connected piston 114 (connected via piston member 115, which is connected to an inboard piston member 117) to move outwardly slightly with respect to the actuator frame 120. The slight movement outwardly of the piston 114 will be taken up in deflection by the seal 116. When the load from the balls 76 (captured between the actuator plates 70,72 and brake shoes 78,80) is removed from the shoes, the residual load of the deflected seal 116 will pull the retracted shoe 78 and lining 82 away from the rotor friction disc 58, causing a "running clearance". The above clearance is adjustable by varying the seal groove 118 contour.

As shown to the right in FIG. 2, a self-adjusting mechanism 112 is provided to compensate for lining wear on the second caliper 20.

A thrust bar 122 has a flange 140 with an indention 142 which fits a projection 144 of the gib 92. The inboard clip 88 has a portion 146 with an aperture allowing the insertion of the projection 144 which attaches a portion of the gib with the brake shoe 78.

As mentioned previously, in normal actuation there is slight movement of the piston 114 with respect to the caliper frame 120, which is taken up in deflection of the seal 116. During actuation, the thrust bar 122 is loaded in compression by virtue of the ball 76 forcing the actuator plate 70 in an inboard direction, pushing against inboard gib 92 in an inboard direction, therefore retaining the thrust bar in its present position since it is locked from moving inboard direction by the clutch member 126. The one-way clutch is made up of the thrust bar 122, rollers 128 and ramp surfaces 130, which will resist brake clamp load in the inboard (arrow 132) direction but allow the thrust bar to slide in the outboard direction for lining takeup (adjustment).

Upon release of the brake, the piston 114 will be pulled back by the seal 116, and all the parts will stay in their prior position. When wear has occurred on the inboard shoe 78, the piston 114 upon actuation will be pulled through the seal 116 to the extent that the seal 116 cannot restore the piston 114 to its prior position with respect to the caliper frame 120. Since the brake shoe 78 is now further outboard by virtue of clip 88, the actuator plate 70 and the inboard gib 92, along with its associated clip 88, will be further outboard, creating a slight clearance between the inboard gib 92 and the flange 140 of the thrust bar. The biasing provided by spring 124 acting on the flange 140 of the thrust bar will cause the thrust bar to be pushed outwardly to take up the slack and to provide the adjustment necessary. The piston sliding force to the seal 116 must be more than the installed load of the adjuster spring 124.

When adjustment is mandated by wear on the lining associated with the outboard brake shoe 80, there will again be relative movement between the caliper 120 and the piston 114 in such a manner which causes the piston to move to an extent that restoration of its prior position by the elastomeric seal 116 will not occur, therefore causing another adjustment in the position of the thrust bar to move the thrust bar further in an outboard direction (left as shown in FIG. 2).

To maintain the rollers 128 in their position in respect to the clutch mechanism, there are flat springs 134 which urge the rollers 128 in an inboard direction.

The movement of the thrust bar in an outboard direction (opposite arrow 132) will be equal to the total wear of the inboard and outboard shoes 78,80, or if wear is equal on both shoes, it will be equal to twice the wear on the inboard shoe 78.

When the brake linings 82 are worn out and the thrust bar 122 has traversed all the way outboard, it can be pushed back inboard by sticking a tool through the aperture 136 and moving the one-way clutch rollers 128 outboard while moving the thrust bar 122 inboard.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A disc brake for restraining rotation of a vehicle wheel comprising having a rotational axis:
   a rotor means connected with the wheel;
   a first caliper pivotally mounted with respect to a vehicle;
   first brake shoe means slidably mounted with respect to the first caliper for selective contact with the rotor means;
   means to selectively move the first shoe means into engagement with the rotor means;
   actuator plate means mounted for relative motion with respect to the vehicle and operatively associated with the first caliper wherein movement of the first caliper resultant of the first shoe means engagement with the rotor means causes the actuator plate means to move;
   a second caliper generally locationally fixed with respect to the vehicle wheel axis;
   a second brake shoe means mounted by the second caliper operatively associated with the actuator plate means for engagement with the rotor means; and
   ramp means for converting movement of the actuator plate means into movement of the second brake shoe means to engage with the rotor means.

2. A disc brake as described in claim 1 wherein the means to move the first brake shoe means includes an electrically actuated actuator.

3. A disc brake as described in claim 1 wherein the first caliper pivots on a fixed axis which is not aligned with the rotational axis of the wheel.

4. A disc brake as described in claim 3 wherein an electric motor which powers the first caliper is torsionally associated with a first gear having a rotational axis coterminous with the pivotal axis of the first caliper and wherein the first gear is torsionally associated with a second gear torsionally associated with a threaded member and wherein there is a first piston means operatively associated with the threaded member to convert movement of the threaded member into movement of the first brake shoe means.

5. A disc brake as described in claim 4 wherein there is a nut threadably engaged on the threaded member which is nonrotative with respect to its association with the first caliper and wherein rotative movement of the threaded member causes the nut to translate, causing the first piston means to be translated by the nut.

6. A disc brake as described in claim 1 mounted for sliding movement along a line parallel to the vehicle wheel axis.

7. A disc brake as described in claim 1 where movement of the rotor means in either direction when the first caliper is actuated causes an actuation of the second brake shoe means.

8. A disc brake as described in claim 1 wherein the actuator plate means has linear movement with respect to the second caliper.

9. A disc brake as described in claim 8 wherein the second brake shoe means experiences a radial component of movement with respect to the rotor means during actuation.

10. A disc brake as described in claim 1 wherein the actuator plate means surrounds both sides of the rotor means and wherein there is opposing second brake means on the second caliper.

11. A disc brake as described in claim 8 wherein the actuator plate means is held by a thrust ball gib.

12. A vehicle wheel disc brake comprising:
    a rotor for attachment to a vehicle wheel, the rotor having a rotational axis;
    frame means with a bore oriented towards the rotor;
    an actuator plate slidably mounted with respect to the frame means for relative linear movement with respect thereto in a plane generally perpendicular to the axis of rotation of the rotor;
    a piston slidably mounted within the frame bore;
    brake shoe means connected with the piston being positioned between the actuator plate and the rotor;
    ramp means for converting linear motion of the actuator plate in a plane generally perpendicular with the axis of rotation of the rotor to translational movement of the brake shoe means in a direction generally parallel with the rotational axis of the rotor;
    elastically deformable ring means surrounding the piston mounted within the frame means for retracting the piston after actuation;
    thrust bar means restraining the actuator plate from movement away from the rotor, the thrust bar means being spring biased to move the actuator plate toward the rotor by a spring having less force than a spring force of the elastically deformable ring means; and
    clutch means allowing thrust bar means movement only toward the rotor.

13. A disc brake for restraining rotation of a vehicle wheel comprising:
    a rotor connected with the wheel having a rotational axis;
    a first caliper pivotally mounted along a fixed axis with respect to a vehicle along an axis noncoterminous with the rotational axis of the rotor;
    a first brake shoe slidably mounted with respect to the first caliper for selective contact with the vehicle wheel, the first brake shoe being connected with a piston operatively associated with a nut nonrotatively connected with the piston, the piston being threadably engaged with a driven threaded member which is torsionally associated with a second gear which is in turn torsionally associated with a first gear which has a rotational axis coterminous with the rotational axis of the first caliper, the first gear being torsionally associated with an electric motor;
    an actuator plate mounted for relative motion with respect to the vehicle and operatively associated with the first caliper wherein movement of the first caliper resultant of the first brake shoe engagement with the rotor causes the actuator plate to undergo translational movement;
    a second caliper fixed with respect to the vehicle;
    a second brake shoe mounted by the second caliper for engagement with the rotor, the second brake shoe being operatively associated with the actuator plate; and
    ramp means for converting the translational movement of the actuator plate into movement of the second brake shoe into engagement with the rotor.

14. A method for restraining rotation of a vehicle wheel comprising:
    connecting with the vehicle wheel a rotor means;
    pivotally mounting with respect to a vehicle a first caliper means;

slidably mounting with respect to the first caliper means for selective engagement with the vehicle wheel a first brake shoe means;

selectively moving the first brake shoe means into engagement with the brake rotor means;

mounting for relative movement with respect to the vehicle and operational association with the first caliper means an actuator plate wherein movement of the first caliper means resultant of the first shoe means engagement with the rotor means causes the actuator plate to move;

mounting in a fixed position with respect to the vehicle a second caliper means;

slidably mounting with respect to the second caliper means a second brake shoe means which is operatively associated with the actuator plate for engagement with the rotor means;

and converting movement of the actuator plate into movement of the second brake shoe means to engage with the rotor means by relative contacting movement between the actuator plate and the second brake shoe means along inclined surfaces wherein the tangential force of the first caliper means caused by the braking torque of the rotor means is multiplied and converted to a clamp load by the second caliper means on the rotor means.

* * * * *